(12) United States Patent
Taylor et al.

(10) Patent No.: US 10,271,666 B2
(45) Date of Patent: Apr. 30, 2019

(54) PRODUCT COUNT TRACKING DEVICE

(71) Applicant: Walmart Apollo, LLC, Bentonville, AR (US)

(72) Inventors: Robert J. Taylor, Rogers, AR (US);
Matthew Alexander, Rogers, AR (US);
Jeffrey S. Cruz, Bentonville, AR (US);
William M. Propes, Bentonville, AR (US); Leigh Ann Scobey, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/493,464

(22) Filed: Apr. 21, 2017

(65) Prior Publication Data
US 2017/0303704 A1    Oct. 26, 2017

Related U.S. Application Data
(60) Provisional application No. 62/326,214, filed on Apr. 22, 2016.

(51) Int. Cl.
*A47F 1/12* (2006.01)
*G07F 9/02* (2006.01)
*G06Q 10/08* (2012.01)

(52) U.S. Cl.
CPC .............. *A47F 1/125* (2013.01); *G07F 9/026* (2013.01); *G06Q 10/087* (2013.01)

(58) Field of Classification Search
CPC .......... G07F 11/38; G07F 9/026; A47F 1/125; A47F 2010/025
USPC ........................................................ 221/4, 7
See application file for complete search history.

(56) References Cited

U.S. PATENT DOCUMENTS

| | | | | |
|---|---|---|---|---|
| 4,742,936 A * | 5/1988 | Rein | ..................... | A47F 1/126 116/278 |
| 5,730,320 A * | 3/1998 | David | ..................... | A47F 1/126 211/59.3 |
| 5,881,910 A * | 3/1999 | Rein | ..................... | A47F 1/126 221/6 |
| 5,884,910 A * | 3/1999 | Mandel | ................. | B65H 29/20 270/58.11 |
| 6,161,724 A | 12/2000 | Blacker | | |
| 6,435,372 B1 * | 8/2002 | Blacker | ............... | A61M 15/009 128/200.23 |
| 6,816,074 B2 | 11/2004 | Wong | | |
| 7,584,016 B2 | 9/2009 | Weaver | | |
| 7,792,711 B2 * | 9/2010 | Swafford, Jr. | ........ | A47F 1/126 705/22 |

(Continued)

OTHER PUBLICATIONS
PCT; App. No. PCT/US2017/028809; International Search Report and Written Opinion dated Jul. 10, 2017.

(Continued)

*Primary Examiner* — Rakesh Kumar
(74) *Attorney, Agent, or Firm* — Fitch, Even, Tabin & Flannery LLP

(57) ABSTRACT

In some embodiments, systems, apparatuses and methods are described herein useful to indicate the number of products on a merchandising unit. Counting devices as described herein maintain an accurate count of the number of products on a given merchandising unit and provides a display of the count.

12 Claims, 7 Drawing Sheets

(56) References Cited

U.S. PATENT DOCUMENTS

| | | | |
|---|---|---|---|
| 8,146,753 B2* | 4/2012 | Yuyama | A61G 12/001 211/59.3 |
| 8,190,289 B2* | 5/2012 | Lockwood | A47F 1/126 221/15 |
| 8,260,456 B2 | 9/2012 | Siegel | |
| 8,676,377 B2* | 3/2014 | Siegel | G06Q 10/08 221/4 |
| 8,941,495 B2* | 1/2015 | Wiese | G08B 13/1654 211/59.2 |
| 9,129,494 B2* | 9/2015 | Valiulis | G08B 13/14 |
| 9,773,224 B2* | 9/2017 | Burnside | G06Q 10/087 |
| 9,805,334 B2* | 10/2017 | Overhultz | A47F 1/126 |
| 2001/0002531 A1* | 6/2001 | Pike | B65B 35/40 53/252 |
| 2003/0000956 A1* | 1/2003 | Maldonado | A47F 1/125 221/120 |
| 2003/0079971 A1* | 5/2003 | Veit | B65G 47/844 198/890.1 |
| 2005/0040123 A1 | 2/2005 | Ali | |
| 2005/0168345 A1* | 8/2005 | Swafford, Jr. | A47F 1/126 340/686.1 |
| 2005/0241911 A1* | 11/2005 | Veit | B65G 47/844 198/370.02 |
| 2005/0279722 A1* | 12/2005 | Ali | A47F 10/00 211/59.3 |
| 2006/0071774 A1 | 4/2006 | Brown | |
| 2009/0048932 A1* | 2/2009 | Barber | G06Q 10/087 705/14.4 |
| 2009/0212065 A1* | 8/2009 | Templer | G07F 9/026 221/133 |
| 2009/0319399 A1* | 12/2009 | Resta | G06Q 10/00 705/28 |
| 2010/0164337 A1* | 7/2010 | Yuyama | A61G 12/001 312/209 |
| 2011/0015781 A1* | 1/2011 | Vardaro | B65D 83/0418 700/231 |
| 2011/0087369 A1* | 4/2011 | Bauer | A47F 1/04 700/232 |
| 2011/0218889 A1 | 9/2011 | Westberg | |
| 2011/0304316 A1* | 12/2011 | Hachmann | A47F 1/126 324/76.11 |
| 2012/0091162 A1* | 4/2012 | Overhultz | A47F 1/126 221/1 |
| 2012/0285979 A1* | 11/2012 | Lockwood | A47F 1/126 221/7 |
| 2013/0117053 A2 | 5/2013 | Campbell | |
| 2014/0008382 A1* | 1/2014 | Christianson | G07F 11/38 221/4 |
| 2014/0124463 A1 | 5/2014 | Goehring | |
| 2014/0201042 A1* | 7/2014 | Meyer | G06Q 10/087 705/28 |
| 2014/0299620 A1* | 10/2014 | Swafford, Jr. | A47F 1/126 221/4 |

OTHER PUBLICATIONS digitalbins.com; "A new solution for inventory management"; https://www.digitalbins.com/downloads/whitepaper/DB%20White%20Paper.pdf; Dec. 4, 2014; pp. 1-27.

Loadstar Sensors; "StockVUE—Vendor Managed Inventory System Using Scales"; http://www.loadstarsensors.com/stockvue-vendor-managed-inventory-system-using-scales.html; Available at least as early as Jan. 27, 2016; pp. 1-7.

Swedberg, Claire; "ShelfX Unveils Store Shelves for Automating Purchases"; http://www.rfidjournal.com/articles/view?8926/; Nov. 2, 2011; pp. 1-3.

* cited by examiner

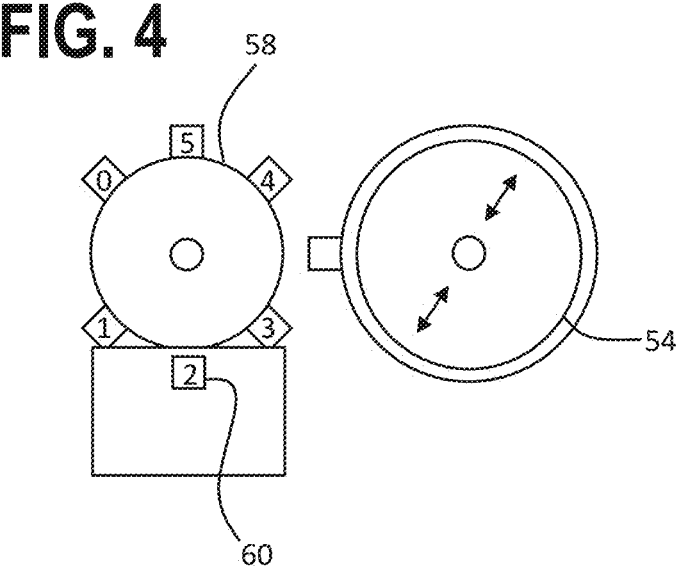
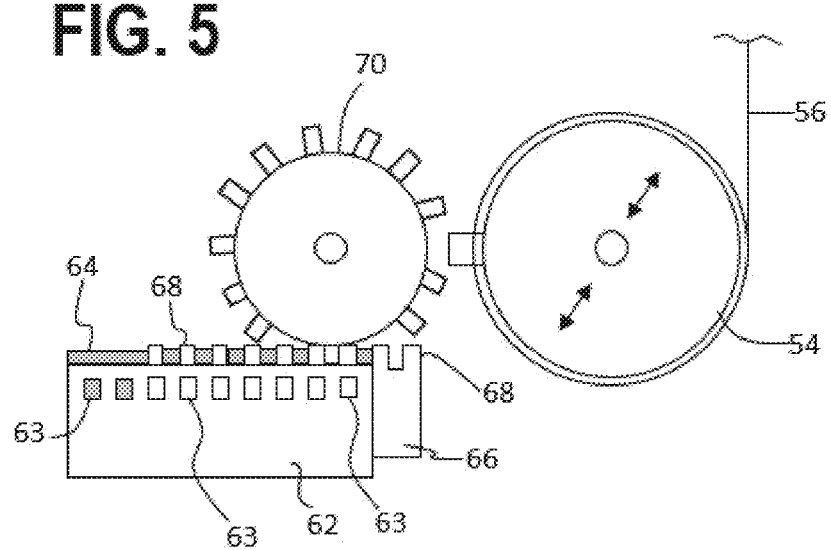

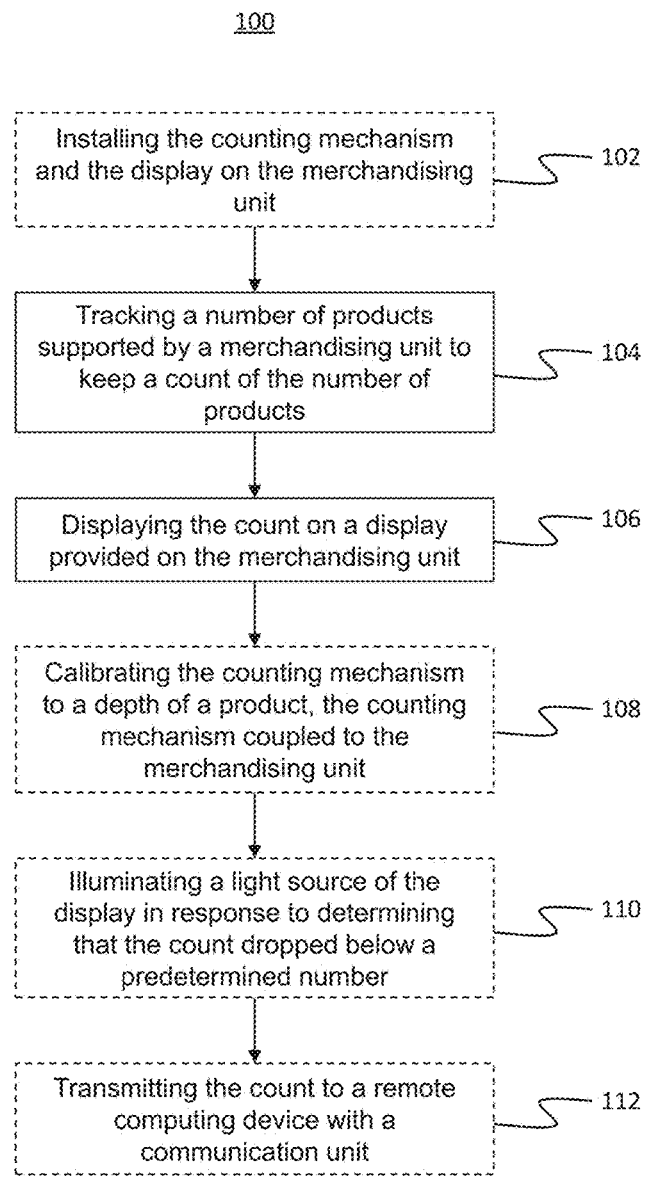

PRODUCT COUNT TRACKING DEVICE

CROSS-REFERENCE TO RELATED APPLICATIONS

This application claims the benefit of U.S. 62/326,214, filed Apr. 22, 2016, which is hereby incorporated by reference herein in its entirety.

TECHNICAL FIELD

This invention relates generally to retail shelving and, more particularly, to management of products for retail shelving.

BACKGROUND

Retail stores often utilize modular shelving units to display products for sale. It can be important to maintain an accurate count of inventory during operation of the store. Pursuant to this, associates have to count products on the shelves. It can be difficult for associates to accurately determine a count of products on the shelves and, as such, one method to ensure an accurate count to remove all of the products from the shelves. Accordingly, the associates must then restock the products on the shelves.

BRIEF DESCRIPTION OF THE DRAWINGS

Disclosed herein are embodiments of systems, apparatuses and methods pertaining to providing an accurate count of products on a shelf. This description includes drawings, wherein:

FIG. 4 is a diagrammatic view of an adjustable member and numbered gear assembly to display a count of products in accordance with several embodiments.

FIG. 5 is a diagrammatic view of an adjustable member and sliding display assembly to display a count of products in accordance with some embodiments.

FIG. 8 is a flowchart in accordance with several embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to indicate the number of products on a merchandising unit, which can include a shelf or a package on a shelf. Counting devices as described herein maintain an accurate count of the number of products on a given merchandising unit and provides a display of the count. So configured, an associate trying to track the number of products need only look at the display rather than taking all of the products off the shelf or out of the package.

Figure 1:
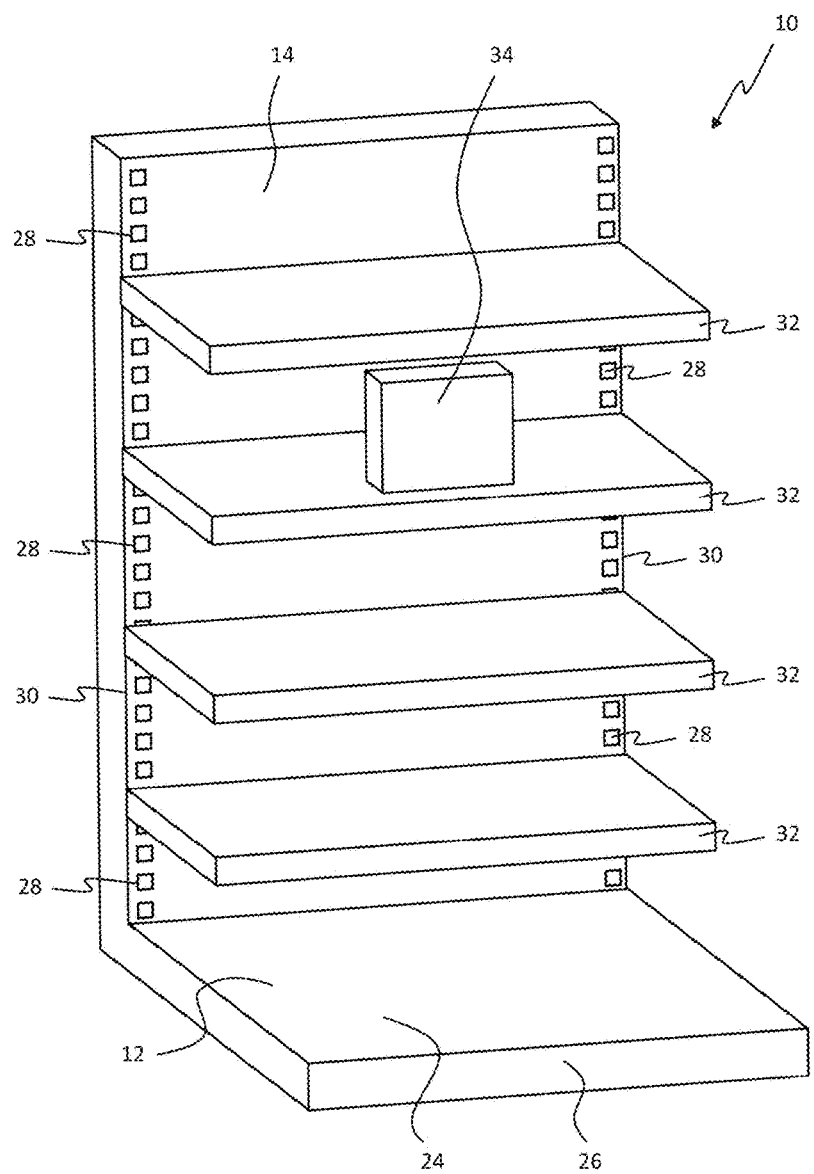
FIG. 1 is a perspective view of a shelving unit in accordance with some embodiments.

A modular shelving unit 10 is shown in FIG. 1. Based on a particular use, multiple shelving units 10 can be aligned in a row to produce an aisle in a retail location. The shelving unit 10 includes a base portion 12 and a back wall 14 extending upwardly therefrom. The base portion 12 can include a base deck 24 and a kick plate 26, as commonly configured. A plurality of shelf notches 28 are vertically disposed adjacent to lateral edges 30 of the back wall 14 to provide anchor points for shelves 32 mounted to the shelving unit 10. After the shelving unit 10 is assembled, associates can then stock products 34 on the shelves 32.

Counting devices or mechanisms 40 are described herein with reference to FIGS. 2-7 that maintain a count of products on a merchandising unit, such as a shelf 32 or package 33, so that associates can accurately track the number of products on display without having to remove products from the shelves 32. Pursuant to this, the counting mechanisms 40 include a display 42 mounted thereto, such as along a front surface 44 thereof, so that the count is easily visible. By another approach, the display 42 can be mounted to the shelf 32. By yet another approach, the counting mechanism 40 and display 42 can be incorporated into the shelf 32, such that the shelf 32 having the counting mechanism 40 and display 42 assembled therein can be delivered to a store as a single unit. Moreover, the counting mechanisms 40 described herein can be calibrated to intended products 34 before delivery, on demand, at the store, etc.

The counting mechanisms 40 described herein can advantageously be standalone devices without the need for system integration or a common power supply. As such, a retail location can install or mount the counting mechanisms 40 on desired shelves 32 of a shelving unit 10 and the counting device will maintain and display an accurate count of products 34 on the shelves 32.

Figure 2:
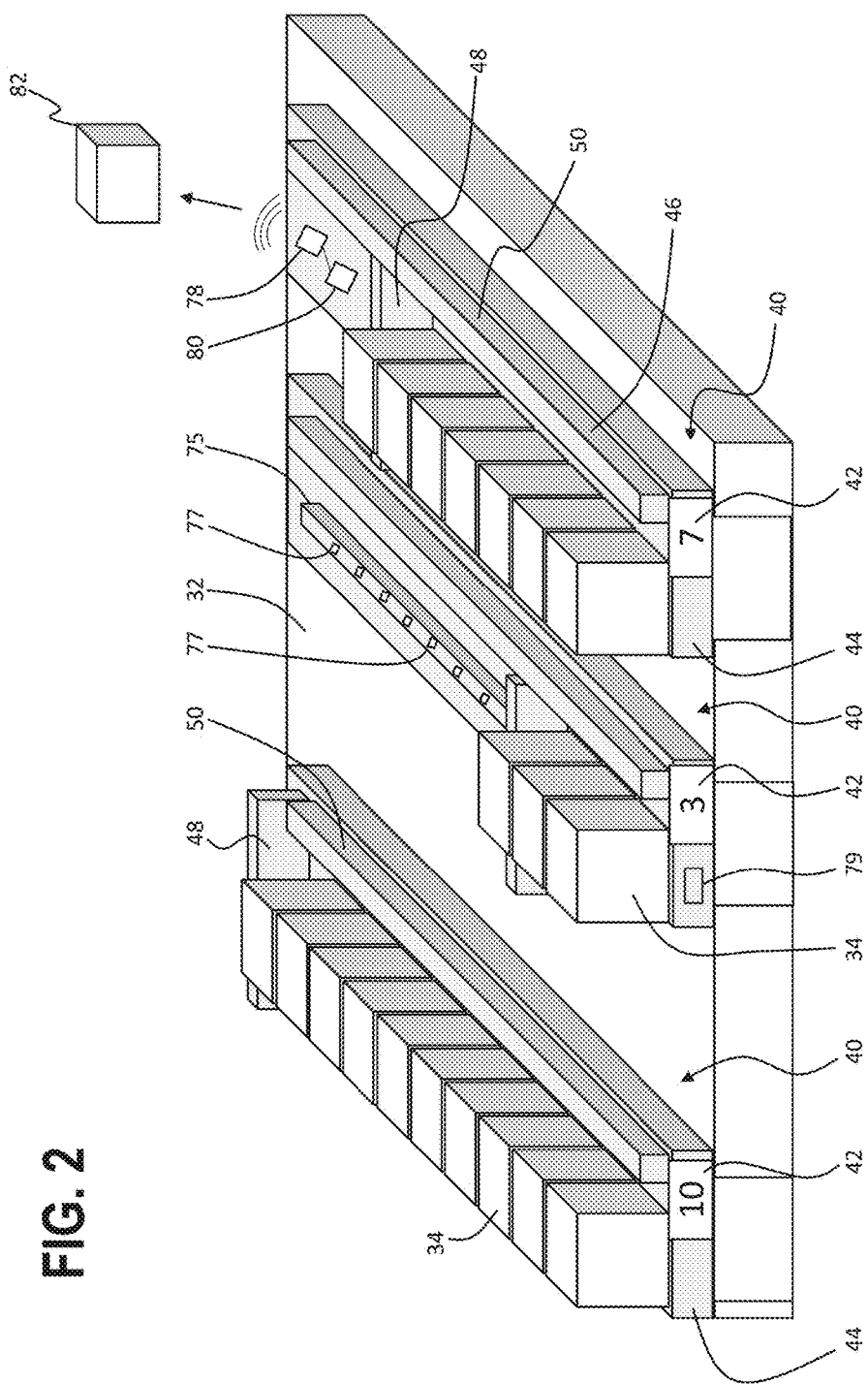
FIG. 2 is a perspective view of counting mechanisms on a shelf in accordance with several embodiments.
Figure 3:
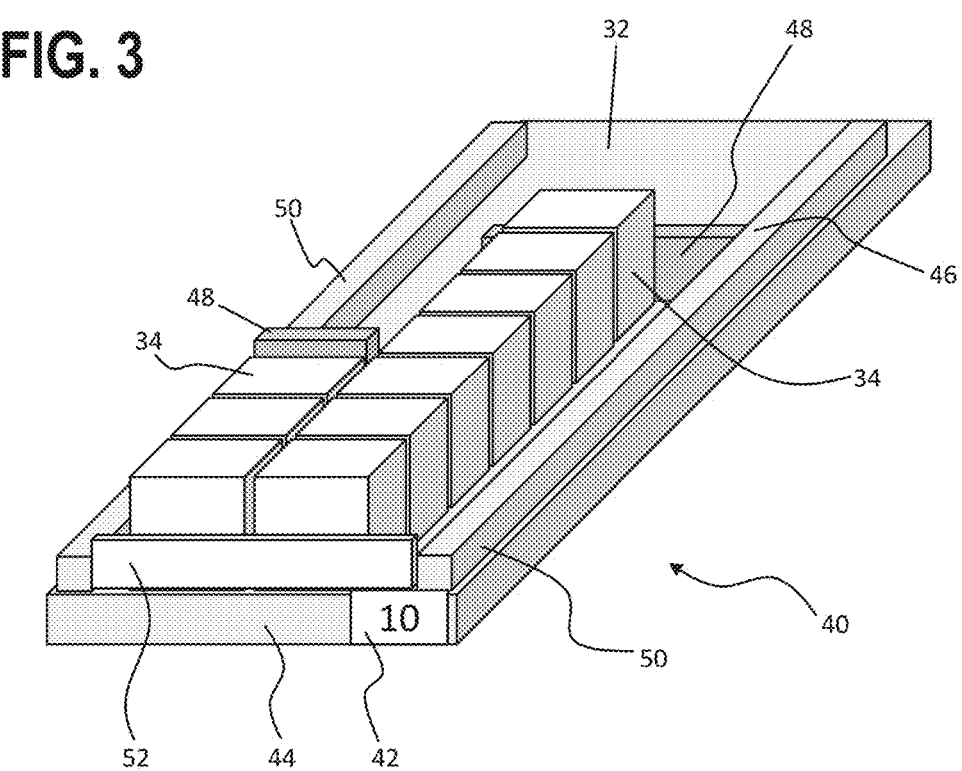
FIG. 3 is a perspective view of an alternative embodiment of a counting mechanism on a shelf in accordance with some embodiments.

By some approaches shown in FIGS. 2 and 3, the counting mechanisms 40 utilize a pusher mechanism 46. The pusher mechanism 46 includes a back member 48 that is connected to and driven in a forward direction by a spring or other suitable mechanism 50. In operation, an associate stocks products 34 by placing the products 34 in front of the back member 48 and pushing the back member 48 rearwardly so that there is additional space for the products 34 in front of the back member 48. The biasing force of the spring 50 can be sized so that the pusher mechanism 46 does not push the products 34 off of the shelves or a front block 52 can be disposed in front of the products 34 so that the products 34 are captured between the front block 52 and the back member 48.

The counting mechanisms 40 advantageously utilize the rearward deflection of the back member 48 to determine how many products 34 are disposed within the pusher mechanism 46. More specifically, the counting mechanisms 40 of this form include an adjustable member or device 54 that can be set to the depth of a single product 34, such that when the back member 48 is pushed rearwardly a set amount, the movement of the adjustable member 54 causes the counting mechanisms 40 to track the amount to determine how many products 34 caused the deflection.

By one approach shown in FIG. 4, the adjustable member or device 54 is a gear that has an adjustable circumference. So configured, an associate can adjust the circumference of the gear 54 to generally equal the depth of one product 34. The gear 54 is operably coupled to the pusher mechanism 46 so that movement of the back member 48 rotates the gear 54. By another approach shown in FIG. 5, the adjustable member 54 is a drum or cylinder with an adjustable circumference. So configured, an associate can adjust the circumference of the drum 54 to generally equal the depth of one product 34. The drum 54 can include a string 56 or other flexible connection to the back member 48. The drum 54 is biased forward, such that movement of the back member 48 forwardly causes the drum 54 to rotate forwardly and wind the string 56 therearound. Similarly, movement of the back member 48 rearwardly causes the drum 54 to rotate rearwardly so that the string 56 unwinds from the drum 54. Although the circumference of the adjustable member 54 is described herein as being set to the depth of one product 34, fractions or multiple depths could also be utilized. These embodiments are particularly advantageous in that they do not contain any electronics requiring a wired or portable power supply. In both approaches, the adjustable member 54 is operably coupled to the display 42 so that the count can be displayed on the front surface 44.

As shown in FIG. 3, the counting mechanisms 40 of these forms using the pusher mechanism 46 can also be configured to maintain a single count for multiple facings of products 34. By this approach, each facing includes the configuration discussed above with the adjustable member 54 driven by movement of the back member 48 of the pusher mechanism 46. The multiple adjustable members 54 are then connected in series to provide a sum of all products 34 in the multiple facings, which can be displayed on the display 42 as set forth herein.

In another form shown in FIG. 1, the counting mechanism 40 can utilize an electrical circuit with the pusher mechanism 46 to determine an accurate count of the products on the shelf 34. In this form, the back member 48 can be movably mounted to a track 75 having a metal connection extending the length thereof. Resistors 77 are coupled to the metal connection at set intervals along the length thereof. The pusher mechanism 46 can be configured so that any resistors in front of the back member 48 are included in the electrical circuit, while any resistors 77 behind the back member 48 are not included. So configured, a processing device 79 can monitor the number of resistors 77 in the circuit and based on the number of resistors 77, determine the number of products 34 on the shelf 32. Additionally, the electrical circuit can include multiple pusher mechanisms 46 to provide a count for multiple facings of a product 34. Power for the electrical connection can be supplied by a local power source, such as a battery, or a wired power source, as desired.

Figure 6:
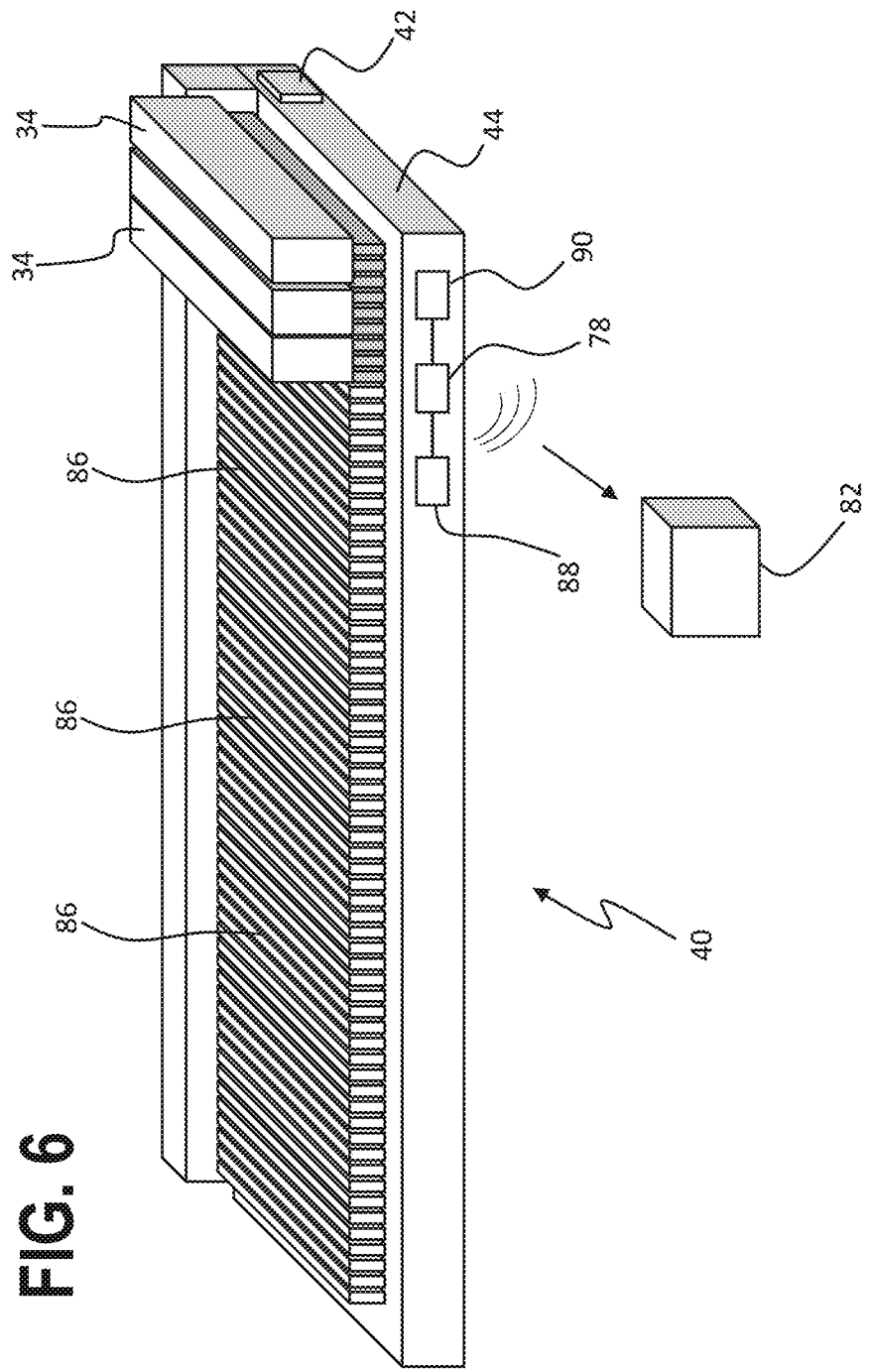
FIG. 6 is a perspective view of a counting mechanism on a shelf in accordance with several embodiments.

By another approach shown in FIG. 6, the counting mechanism 40 can utilize a plurality of pressure sensor mechanisms 86 disposed along the depth of the shelf 32. As shown, the pressure sensors 86 can be sized so that a row of the sensors 86 can count the number of products 34 in one facing. More specifically, as an associate stocks products 34 on the shelf 32 and the sensors 86 disposed thereon, the weight of the products 34 are identified by the sensors 86. When an associate enters the depth of a single product 34, such as with a calibration setting switch 88, which can correspond to one sensor, two sensors, three sensors, etc., a processing device 90 coupled to the sensors 86 can determine how many products 34 are on the shelf and cause the count to be displayed on the display 42. In the illustrated form, the pressure sensors 86 are oriented with a relatively longer dimension along a longitudinal axis thereof extending along a portion of the width of the shelf 32 and a relatively shorter dimension orthogonal to the longitudinal axis thereof extending along a portion of the depth of the shelf 32.

By some approaches, the display 42 can also be free from electronics. In one form shown in FIG. 4, the display 42 includes a numbered gear 58 with numbers disposed on a periphery thereof that rotates to display a current count of products 34 on the shelf 32. By one approach, the numbered gear 58 is operably coupled to the adjustable member 54. The numbered gear 58 and adjustable member 54 are coupled such that one rotation of the adjustable member 54 causes the numbered gear 58 to rotate one position. By another approach, any of the processing devices as described herein can be operably coupled to the numbered gear 58 and be configured to cause the numbered gear 58 to rotate one position for every product 34 detected on the shelf 32.

The display 42 of this form can include a window 60 that aligns with the numbers on the numbered gear 58 to identify the current count. So configured, when no products 34 are on the shelf, the numbered gear 58 is aligned so that "0" is displayed in the window 60. When an associate stocks products 34 on the shelf 32 and pushes the back member 48 rearwardly, the numbered gear 58 rotates one position so that the current number of products 34 on the shelf 34 is displayed in the window 60, such as due to a full rotation of the adjustable member 54 or a signal from the processing device. In another form, the display 42 can be a counter mechanism, similar to an odometer, that is coupled to any of the processing devices described herein or the adjustable member 54 so that one rotation of the adjustable member 54 rearwardly drives the counter mechanism up one and one rotation of the adjustable member 54 forwardly drives the counter mechanism down one.

In another form shown in FIG. 5, the display 42 includes a front portion 62 including a number of windows 63, a background portion 64, and a blocking portion 66 disposed between the front portion 62 and the background portion 64. The blocking portion 66 can be driven between the front and background portions 62, 64 to selectively expose the background portion 64 through the windows 63, which can have a distinguishable color or pattern on a surface thereof, such that a user can visually identify the number of windows 63 having the background portion 64 exposed therethrough which corresponds to the number of products 34 on the shelf 32.

By one approach, the blocking portion 66 includes teeth 68 along the top thereof that couple to a gear 70 driven by the adjustable member 54. In other forms, the adjustable member 54 could directly drive the blocking portion 66. The blocking portion 66 and the gear 70 are sized so that one rotation of the adjustable member 54, causes the gear 70 to rotate by one position, which causes the blocking portion 66 to drive forwardly or rearwardly one position accordingly. So configured, when an associate stocks a product 34, the adjustable member 54 rotates once, which drives the gear 70 and the blocking portion 66 forward one position to expose the background 64 through one of the windows 63. By another approach, any of the processing devices as described herein can be operably coupled to the blocking portion 66 and be configured to cause the blocking portion 66 to slide one position for every product 34 detected on the shelf 32. As such, the display 42 of these forms displays the count by the number of windows 62 through which the background 64 is visible.

Figure 7:
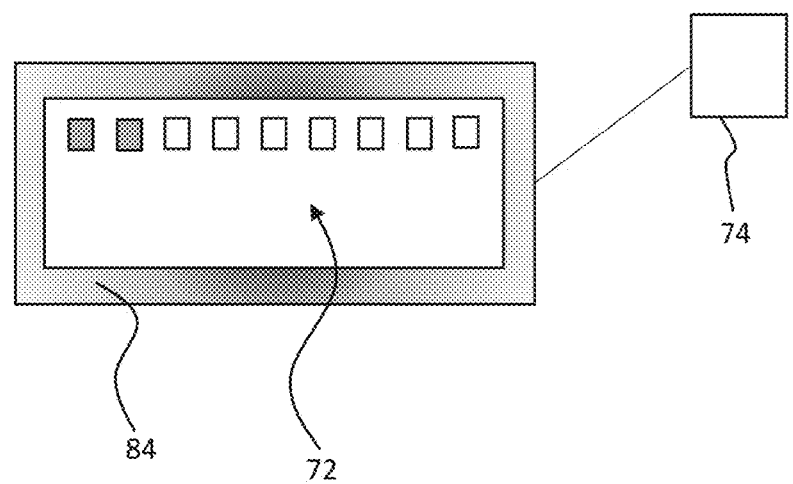
FIG. 7 is a diagrammatic view of a display having an array of light sources and a stocking indicator in accordance with some embodiments.

The display 42 can also include electronics powered by a battery or a wired power source. By one approach, the display 42 can be an electronic number display, LCD, an array of light sources or LEDs 72 as shown in FIG. 7, or other electronic display in communication with any of the processing devices described above or a separate processing device 74 that receives rotational data from the adjustable member 54 to electronically display the count of products 34 on the shelf 32.

By some approaches, it can be helpful to display a general indication of the level of stocking of products 34 on the shelf 32. As such, the display 42 can include an indicator 84 as shown in FIG. 7 that visually indicates a stocked shelf, a low shelf corresponding to a stock number dropping below a predetermined number, and an empty shelf. For example, the indicator 84 can be a light source or LED with colors that indicate the levels, such as green, yellow, and red. If desired, the indicator 84 can be incorporated with the other displays 42 described above, such as providing a backlight or the like so that the display 42 provides both an accurate count of the products 34 on the shelf and a general indication of stock level.

Although the counting mechanisms 40 and displays 42 are described above as being mounted to shelves 32 of a shelving unit 10, the counting mechanisms 40 and displays 42 can also be incorporated into a package for display on a shelf.

In some embodiments, the counting mechanisms 40 described above can include a transmitter 78 coupled to the processing devices set forth above or a separate processing device 80 as shown in FIGS. 1 and 6. So configured, the counting mechanisms 40 of this form can transmit the current count of product 34 to a remote computing device or database 82. The remote computing device 82 can then be configured to notify a user of a low stock level and/or track inventory levels to determine whether stocking and ordering procedures need to be revised. The term computing device refers broadly to any control circuit, microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The computing device 82 may be configured (for example, by using corresponding programming stored in a memory as will be well understood by those skilled in the art) to carry out one or more of the steps, actions, and/or functions described herein.

So configured, as shown in FIG. 8, the counting mechanisms 40 and displays 42 can be utilized 100 in a retail location to track a count of products 34. Optionally, a user can first install 102 the counting mechanism 40 on the shelf 32 of a shelving unit 10 so that the display 42 thereof is visible. The counting mechanism 40 then tracks 104 a number of products 34 supported by the merchandising unit and displays 106 the count on the display 42. A user can also optionally calibrate 108 the counting mechanism to a suitable dimension of the product 34, such as a depth thereof, via the adjustable member 54 or calibration switch 88. The counting mechanism 40 can also optionally illuminate 110 a light source of the indicator 84 in response to determining that the count dropped below a predetermined number. The counting mechanism 40 can also optionally transmit 112 the count to the remote computing device or database 82 via the transmitter 78.

In some embodiments, an apparatus for tracking a product number count of merchandised products is described herein that includes a merchandising unit supporting one or more products for display to a consumer, a counting mechanism coupled to the merchandising unit and configured to determine a count of the number of products supported in one or more rows by the merchandising unit, and a display coupled to the counting mechanism and visible on the merchandising unit. The display can be configured to display the count of the number of products supported in the one or more rows by the merchandising unit.

By further embodiments, the counting mechanism can include a pusher configured to track the depth of a row of products. In one approach, the counting mechanism can further include an adjustable gear configured to be adjusted so that a circumference of the adjustable gear is generally equal to a depth of a product and coupled to the pusher, such that as a product is placed in or removed from the row, the pusher is driven rearwardly or forwardly by the depth of the product and the adjustable gear makes a full rotation to increase or decrease the count on the display by one respectively. By another approach, the counting mechanism can further include an adjustable, spring-driven drum configured to be adjusted so that a circumference of the drum is generally equal to a depth of a product and coupled to the pusher by a string wrapped around the drum, such that as a product is placed in or removed from the row, the pusher is driven rearwardly or forwardly by the depth of the product and the drum makes a full rotation to increase or decrease the count on the display by one respectively.

In further embodiments, the counting mechanism can include a plurality of pressure sensitive sensors extending along a depth of the merchandising unit and a calibration setting switch configured so that a product can be placed on the pressure sensitive sensors and depression of the calibration setting switch sets a product depth setting corresponding the number of pressure sensitive sensors activated by the product.

In several embodiments, a method of tracking a product number count of merchandised products is described herein that includes tracking, using a counting mechanism coupled to a merchandising unit configured to support one or more products in one or more rows, a number of products supported by the merchandising unit to keep a count of the number of products and displaying the count on a display provided on the merchandising unit.

In further embodiments, the method can include calibrating the counting mechanism to a depth of a product, the counting mechanism coupled to the merchandising unit.

In further embodiments, calibrating the counting mechanism can include adjusting the circumference of an adjustable gear of the counting mechanism such that the circumference of the adjustable gear is generally equal to the depth of the product, where the adjustable gear is configured to rotate as products are placed in or removed from the row and update the count accordingly.

In further embodiments, calibrating the counting mechanism can include adjusting the circumference of a spring-driven drum of the counting mechanism such that the circumference of the drum is generally equal to the depth of the product, where the drum has a string wrapped therearound connected to a product pusher mechanism such that as products are placed in or removed from the row, the string unwinds from or winds onto the drum and the drum rotates to update the count.

In further embodiments, calibrating the counting mechanism can include receiving a signal that a number of pressure sensors of the counting mechanism have a product placed thereon and receiving a signal indicating that the number of pressure sensors corresponds to the depth of the product.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

The invention claimed is:

1. An apparatus for tracking a product number count of merchandised products, the apparatus comprising:
    a merchandising unit supporting one or more products for display to a consumer;
    a counting mechanism coupled to the merchandising unit and configured to determine a count of a number of products of the one or more products supported in a row by the merchandising unit, wherein the counting mechanism comprises:
        a pusher configured to track a first depth of the row;
        an adjustable, spring-driven drum coupled to the pusher by a string wrapped around the drum and configured to be adjusted so that a circumference of the drum is generally equal to a second depth of a product of the number of products, wherein the pusher is driven rearwardly or forwardly by the depth of the product as the product is placed in or removed from the row while the drum makes a full rotation to increase or decrease the count on a display by one respectively; and
        a gear driven by the adjustable, spring-driven drum; and
    the display coupled to the counting mechanism and visible on the merchandising unit, the display comprising a front portion having a number of windows, a background portion, and a blocking portion disposed between the front portion and the background portion, the display configured to display the count of the number of products supported in the row by the merchandising unit through a first rotation of the gear that causes the blocking portion to be driven, wherein the blocking portion comprises teeth along a top of the blocking portion that couple to the gear, and wherein a second rotation of the adjustable, spring-driven drum causes the gear to rotate by one position causing the blocking portion to drive forwardly or rearwardly one position accordingly.

2. The apparatus of claim 1, wherein the merchandising unit comprises one of a shelf or a package.

3. The apparatus of claim 1, wherein the counting mechanism is configured to keep a count of the number of products supported in the row.

4. The apparatus of claim 1, wherein the counting mechanism is free from electronics.

5. The apparatus of claim 1, wherein the display includes a light source configured to provide illumination after the count drops below a predetermined number to indicate a low stock level.

6. The apparatus of claim 1, further comprising a communication unit coupled to the counting mechanism, the communication unit configured to send the count to a remote computing device.

7. An apparatus for tracking a product number count of merchandised products, the apparatus comprising
    a merchandising unit supporting one or more products for display to a consumer;
    a counting mechanism coupled to the merchandising unit and configured to determine a count of a number of products of the one or more products supported in a row by the merchandising unit, wherein the counting mechanism comprises:
        a pusher configured to track a first depth of the row;
        an adjustable member configured to be adjusted so that a circumference of an adjustable gear is generally equal to a second depth of a product of the number of products, the adjustable gear coupled to the pusher, such that as the product is placed in or removed from the row, the pusher is driven rearwardly or forwardly by the second depth of the product while the adjustable gear makes a full rotation to increase or decrease the count on a display by one respectively; and
        a numbered gear having numbers disposed on a periphery thereof and operatively coupled to the adjustable member such that one rotation of the adjustable member causes the numbered gear to rotate one position displaying a number of the numbers disposed on the periphery corresponding to a current count of products in the row; and
    the display coupled to the counting mechanism and visible on the merchandising unit, the display comprising a window configured to align with the number corresponding to the current count of products in the row.

8. The apparatus of claim 7, wherein the merchandising unit comprises one of a shelf or a package.

9. The apparatus of claim 7, wherein the counting mechanism is configured to keep a count of the number of products supported in the row.

10. The apparatus of claim 7, wherein the counting mechanism is free from electronics.

11. The apparatus of claim 7, wherein the display includes a light source configured to provide illumination after the count drops below a predetermined number to indicate a low stock level.

12. The apparatus of claim 7, further comprising a communication unit coupled to the counting mechanism, the communication unit configured to send the count to a remote computing device.

* * * * *